United States Patent [19]

Curran et al.

[11] 4,085,614
[45] Apr. 25, 1978

[54] VORTEX FLOW METER TRANSDUCER

[75] Inventors: John R. Curran, Attleboro; George E. Sgourakes, Millis; David A. Richardson, Sheldonville, all of Mass.

[73] Assignee: The Foxboro Company, Foxboro, Mass.

[21] Appl. No.: 639,776

[22] Filed: Dec. 11, 1975

Related U.S. Application Data

[63] Continuation of Ser. No. 463,301, Apr. 23, 1974, abandoned.

[51] Int. Cl.² .............................................. G01F 1/32
[52] U.S. Cl. ................................................... 73/194 VS
[58] Field of Search ......................... 73/194 B, 194 VS

[56] References Cited

U.S. PATENT DOCUMENTS

| 1,215,135 | 6/1917 | Fisher | 73/194 |
|---|---|---|---|
| 2,869,366 | 1/1959 | Nitikman | 73/194 |
| 3,116,639 | 1/1964 | Bird | 73/194 |
| 3,370,463 | 2/1968 | Chanaud | 73/194 |
| 3,564,915 | 2/1971 | Tomota et al. | 73/194 |
| 3,600,612 | 8/1971 | Beeken | 73/194 |
| 3,693,438 | 9/1972 | Yamasaki et al. | 73/194 |
| 3,722,273 | 3/1973 | Yamasaki et al. | 73/194 |
| 3,796,095 | 3/1974 | Fussell, Jr. | 73/194 |
| 3,867,839 | 2/1975 | Herzl | 73/194 |
| 3,927,566 | 12/1975 | Zanker | 73/194 |

FOREIGN PATENT DOCUMENTS

| 2,229,583 | 11/1973 | Germany | 73/194 |
|---|---|---|---|
| 4,610,233 | 3/1971 | Japan | 73/194 |

OTHER PUBLICATIONS

Mair, "The Effect of a Rear Mounted Disk on the Drag of a Blunt–Based Body of Revolution" in Aeronautical Quarterly, Nov. 1965, pp. 350–360.

*Primary Examiner*—Herbert Goldstein
*Attorney, Agent, or Firm*—Parmelee, Johnson, Bollinger & Bramblett

[57] ABSTRACT

A vortex-shedding flow-sensing instrument comprising a flat-faced vortex-generating plate integral with a downstream sensor-bar having flat sides set back laterally with respect to the rows of vortices shed from the edges of the vortex-generating plate. The side surfaces of the plate are tapered inwardly at a moderate angle, and extend downstream a short distance to rear surfaces at right angles with respect to the direction of fluid flow. The downstream end of the sensor bar comprises a tail piece the side surfaces of which are tapered inwardly at a moderate angle, and extend downstream a short distance to a rear surface perpendicular to the direction of fluid flow.

The sensor bar carries a liquid-filled capsule having as side walls a pair of flexible diaphragms effectively in the plane of the sensor-bar side surfaces. These diaphragms are of moderately large area so as to respond to a relatively large portion of the vortex energy. The diaphragms transmit alternating vortex pressure pulses interiorly of the capsule to a sensing element in the form of a ceramic disc having piezo-electric properties. The resulting alternating voltage signal developed by this element is coupled through lead wires to an amplifier arranged to produce a flow signal suitable for transmission over relatively long distances.

11 Claims, 13 Drawing Figures

FLOW PIPE SYSTEM

VORTEX FLOW METER TRANSDUCER

This is a continuation, of application Ser. No. 463,301 Filed Apr. 23, 1974 now abandoned.

BACKGROUND OF THE INVENTION

1. Field of the Invention

This invention relates to fluid flow measuring apparatus. More particularly, this invention relates to flow meters of the vortex shedding type, typically employed to measure the velocity of fluid flow (either liquid or gas) through a pipe or other channel.

2. Description of the Prior Art

It has been known for many years that vortices are developed in a fluid flowing past a non-streamlined obstruction. It has also been known that with certain arrangements the vortices are developed by alternately shedding at regular intervals from opposite edges of the obstruction to form corresponding rows of vortices. Such vortices establish a so-called von Karman "vortex street", which is a stable vortex formation consisting of two nearly-parallel rows of evenly-spaced vortices travelling with the flow stream.

In a von Karman vortex street, the vortices of one row are staggered relative to those of the other row by approximately one-half the distance between consecutive vortices in the same row. The spacing between successive vortices in each row is very nearly constant over a range of flow rates, so that the frequency of vortex formation is correspondingly proportional to the velocity of the fluid. Thus, by sensing the frequency of vortex shedding, it is possible to measure the fluid flow rate.

Various proposals have been made for such flow measuring apparatus of the vortex-shedding type, and some equipment has gone into commercial use. Commonly, such apparatus comprises a rod-like vortex-shedding obstruction positioned in the flowing fluid at right angles to the direction of fluid flow. The obstruction has in many suggested arrangements been a right-circular cylinder, typically a relatively thin, elongate element as shown for example in U.S. Pat. No. 3,564,915 (FIG. 4). Other shapes have been proposed. For example, U.S. Pat. No. 3,116,639 (Bird), shows in FIG. 10 an obstruction of triangular cross-section positioned with one flat surface facing upstream. In like vein, U.S. Pat. No. 3,572,117 (Rodely) also shows the same triangular cross-section arrangement, and additionally shows various other shapes comparable to known configurations as disclosed for example in "Fluid Dynamic Drag", published in 1965 by S. F. Hoerner (see particularly pages 3–7 and 3–17).

A number of different techniques have been proposed for detecting the shedding vortices so as to devlop a flow signal responsive to the shedding frequency. Thermal sensors of the so-called "hot-wire" type (i.e., thermistors, hot films, etc.) frequently have been used in vortex flow meters. The electrical resistance of such sensor elements varies with changes in the cooling rate caused by the passage of the vortices, or by changes in streamline velocity, and this resistance variation is detected by measuring the corresponding changes in current flow through the element.

Such thermal detectors have not been satisfactory for industrial applications. The sensor elements typically are delicate and subject to damage from wear or impact, and also are subject to shorting-out from fluid leakage. A potential hazard is created because the sensor elements must be heated to a temperature above that of the flowing fluid, and because an electrical current must be introduced into the sensor equipment. The output signal generally is small and difficult to detect without highly complex electronic circuitry.

In addition, the output signal appears as a change-in-level of a non-zero current, and thus inherently presents a problem of separating the variable component from the fixed signal level. The output signal variation ordinarily is a small fraction of the fixed signal level, and is particularly subject to noise due to cooling effects from sources other than vortices, as well as being subject to extraneous variations resulting from changes in ambient conditions. Moreover, the output signal variations decrease with increasing vortex frequency, and thus tend to be lost in noise signals at the higher flow rates. Protective coatings on the sensor element are generally quite thin in order to minimize this effect, but this, in turn, results in undesirably low resistance to wear from the flowing fluid.

Other types of detectors have been suggested in an effort to overcome the deficiencies of thermal sensors. In one vortex-detecting arrangement used commercially, a shuttle-like element is mounted in a lateral passageway through the vortex-shedding obstruction to be oscillated back-and-forth by the pressure fluctuations of the passing vortices. The shuttle movement is detected by a nearby pick-up coil to produce a signal reflecting the frequency of vortex generation. The above-mentioned U.S. Pat. No. 3,564,915 shows such an oscillating type of sensor using a ball element (FIG. 7B). That patent also suggests (FIG. 7A) a diaphragm-type device mounted in the center of a lateral bore extending through a rod-shaped obstruction, but apparently does not relate this to any particular sensor design.

As still another approach to the problem, the above-mentioned Bird U.S. Pat. No. 3,116,639 shows a relatively thin vane-like sensing element located downstream of the vortex-shedding obstruction, positioned in alignment with the direction of fluid flow and centrally located so that the spaced rows of vortices pass along opposite sides thereof. This vane-like element is said to oscillate rotatably in a twisting, torsional movement about an axis perpendicular to the fluid flow direction, in response to the pressure fluctuations of the vortices passing thereby. It is proposed in the patent that the length of the vane, in the direction of fluid flow, should be equal to the vortex spacing in a row of vortices.

Various electrical transducer means are proposed in the above-mentioned Bird U.S. Pat. No. 3,116,639 for detecting the intended rotational movement of the vane, as by sensing with conventional electro-magnetic means the oscillatory twisting motion of a support shaft for the vane. This patent also puts forth the notion that the vane it discloses might be made of a piezo-electric material which is strained cyclically by the passage of the vortices along its operative faces to produce an alternating voltage. Piezo-electric means also are proposed to be used as a fluid-fluctuation detectors in U.S. Pat. Nos. 2,809,520 and 3,218,852. None of these prior disclosures, however, shows a practical flow meter arrangement, and developers of commercially-offered apparatus have not attempted to adapt piezo-electric devices to vortex flow meters, resorting instead to other arrangements such as the thermal detectors described previously herein.

The vortex flow-metering devices proposed heretofore have suffered from important drawbacks. For example, certain types of such flow meters have been generally complex and quite expensive to manufacture, and thus have not been adaptable to many applications where cost is a significant factor. Also, available vortex flow-metering apparatus typically has not been adequately reliable in operation, and particularly in some cases has not been capable of satisfactory operation for measuring the flow rate of hostile fluids, e.g. fluids containing dirt, corrosive liquids or gases, or other potentially harmful material such as material which tends to coat the surfaces of an object in the flow stream. Many vortex flow meters have not been capable of sufficiently linear operation over desirably wide ranges of fluid flow rates.

SUMMARY OF THE INVENTION

In an embodiment of this invention to be described hereinbelow in detail, a flow meter of the vortex-shedding type is provided comprising a unique plate-like vortex-shedding obstruction. This plate is formed with a flat front face the side edges of which are relatively sharp to aid in establishing clean-cut vortex generation. The side edge regions of the plate are followed (in a downstream sense) by respective inwardly-sloping side surfaces terminating a short distance downstream, preferably, in certain configurations, at flat rear surfaces parallel to the front face of the plate, i.e. perpendicular to the direction of fluid flow. This overall configuration has been found to provide desirably strong, stable vortex shedding.

Further downstream, i.e. beyond the perpendicular rear surfaces of the vortex-generating plate, is a bar-like sensor-carrying member with flat, parallel side surfaces aligned with the direction of fluid flow. The transverse spacing between the flat side surfaces of this bar-like member is substantially less than the vortex-generating plate. The straight side surfaces of the bar appear somewhat as shelves which form, in cooperation with the corresponding adjacent plate surfaces, cavity-like regions providing for accommodation, without significant interference, of the full extent of the vortices shed from the vortex-generating plate edges.

This bar-like member, located downstream of the vortex-generating plate, is formed in the region of the shelf-like side surfaces with an interior chamber containing a vortex-sensing capsule sealed off from the process fluid by flexible diaphragms at both side walls. This sealed capsule contains a ceramic disc of the two-layered type adapted to produce, by flexure-bending piezo-electric action, electrical signals responsive to variations in pressure applied to the side surfaces of the disc as a result of vortex shedding. The interior of the capsule is filled with a fluid such as oil which transmits pressures from the deflectable sealing diaphragms to the side surfaces of the ceramic disc. As the vortices shed alternately alongside the two opposed sealing diaphragms, the vortex pressure fluctuations are transmitted through the oil-filling to the ceramic disc which develops corresponding electrical output signals indicative of the rate of fluid flow.

This transducer produces strong signals corresponding to flow rate, and has a desirably high signal-to-noise ratio. The signal strength actually increases with increasing vortex frequency, providing an important advantage particularly in comparison to thermal sensors. A sealed unit as described hereinbelow is resistant to damage, and is capable of operation in hostile or dirty fluids. The sealing diaphragms are so located as to minimize the chance of their being damaged by suspended particles in the process fluid. The transducer output signal is relatively clean, and can be processed without expensive and complicated electronic circuitry such as sophisticated filters or the like.

Accordingly, it is a principal object of the present invention to provide superior flow measuring apparatus of the vortex-shedding type. Other more detailed objects, aspects and advantages of the invention will be pointed out in, or apparent from, the following written description considered together with the accompanying drawings.

DESCRIPTION OF THE PREFERRED EMBODIMENT

Figure 1:
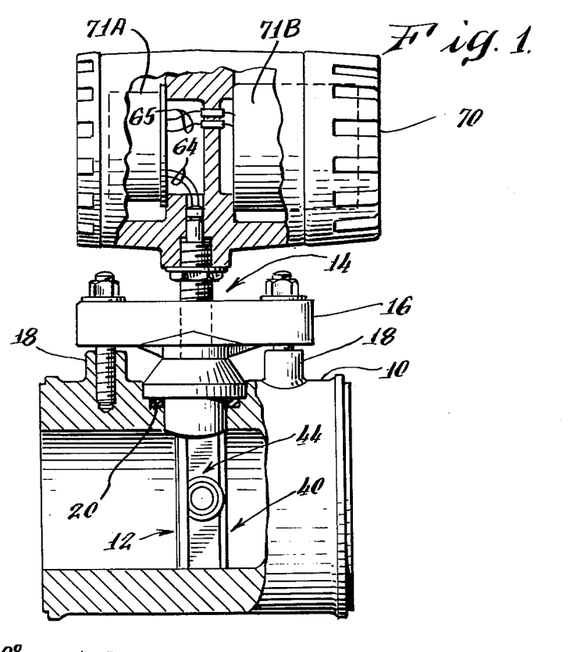
FIG. 1 is a side elevation view, partly broken away, of a flow meter constructed in accordance with principles of this invention.

Referring now to FIG. 1, a flow meter constructed in accordance with principles of the present invention comprises a pipe section 10 adapted to be coupled by means of conventional end flanges into a pipe system (not shown) carrying fluid the flow velocity of which is to be determined. Mounted centrally in the pipe section 10, in the path of the flowing fluid, is an elongate, upstanding body, generally indicated at 12, serving as a composite vortex-generating and sensing unit. This body 12 is disposed vertically, with its longitudinal axis perpendicular to the direction of fluid flow (in this case flowing from left-to-right). However, it should be understood that a vertical disposition is not required, and that for some applications a horizontal or other non-vertical position of the body 12 will be preferred.

Figure 2:
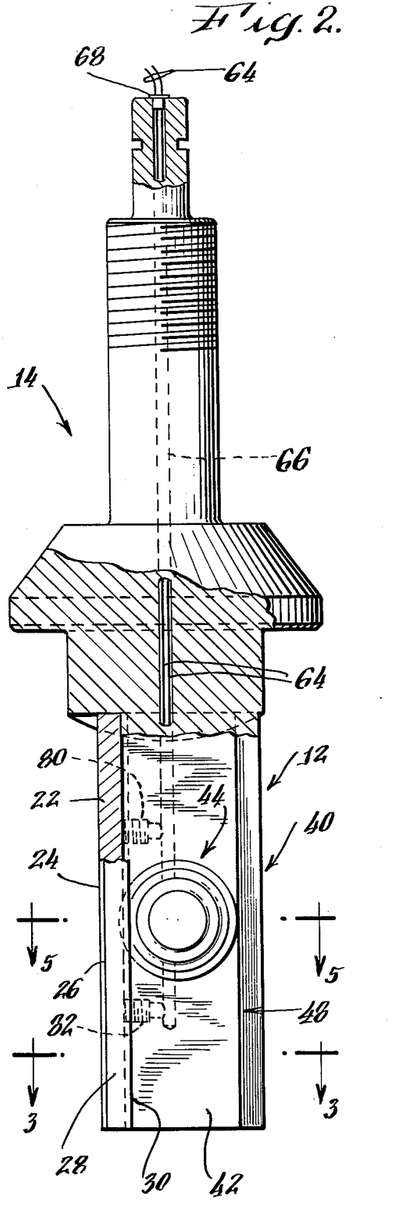
FIG. 2 is an elevation view of the integral flow-bar member which is mounted in a flow-metering pipe section and readily removable therefrom as a unit.

Referring now also to FIG. 2, the flow-metering body 12 advantageously forms part of an elongate, integral meter member 14 which passes vertically down through an opening in the top of the pipe section 10. With such an arrangement, the body 12 is readily removable from its operating position in the pipe section, as for maintenance purposes, cleaning, or the like. The integral member 14 is held in place by a clamp arrangement including a cross-piece 16 fastened in conventional fashion to upstanding bosses 18 cast with the pipe section. A crushed gasket 20 seals the pressure joint between the member 14 and the pipe section wall.

Figures 3, 4:
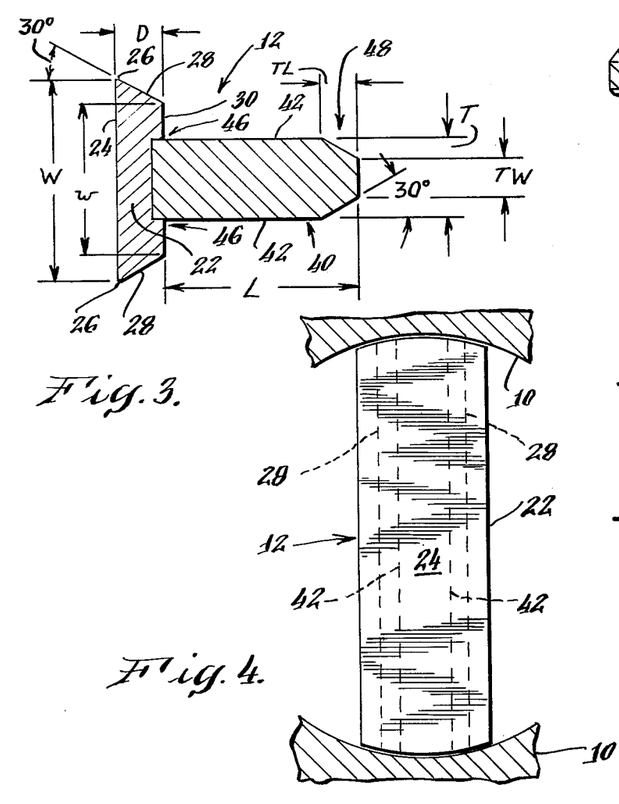
FIG. 3 is a horizontal section taken along line 3—3 of FIG. 2 to show the outline configuration of the vortex-generating plate and its associated sensor bar.
FIG. 4 is a front elevation view of the vortex generating plate, showing the curved top and bottom edges adapted to match the curved contour of the adjacent pipe section.

Referring now also to FIGS. 3 and 4, the body 12 comprises a vortex-generating plate 22 having a flat front surface 24 facing upstream towards the oncoming fluid. The sides of the plate 22 desirably are formed with relatively sharp edges 26 which are followed by flat side surfaces 28 extending downstream with an inward taper at a moderate angle with respect to the direction of fluid flow, e.g. a taper angle between about 5° to 45°, and advantageously 30° as shown. The vortex-generating plate 22 preferably is relatively thin. Thus the side surfaces 28 extend downstream only a relatively short distance D, substantially less than the width W of the plate 22, and preferably between about one-tenth and one-half of the width. In the specific embodiment shown in the drawings, the side surfaces terminate at flat rear surfaces 30 which are parallel to the front face 24, i.e. perpendicular to the direction of fluid flow.

This configuration of the vortex-generating plate 22 has been found capable of developing strong, stable vortices from the upstream edges 26. These side edges ideally define sharp angles between the front face 24 and the inwardly tapered side surfaces 28. However, for ease of manufacture and good quality control, these edges can, as shown, be flattened for a very short distance downstream without significantly interfering with the development of the desired vigorous vortices.

In accordance with one important aspect of the present invention, the strong vortices shed by the edges 26 of the plate 22 are sensed directly inside the wake of the turbulence immediately downstream of the plate, by means positioned between the two rows of vortices. For this purpose, directly behind (i.e. downstream of) the vortex-generating plate 22 there is positioned a generally rectangular bar-like sensor-carrying member 40 having parallel side surfaces 42 aligned with the direction of fluid flow, i.e. the side surfaces are perpendicular to the rear surfaces 30 of plate 22.

Figure 5:
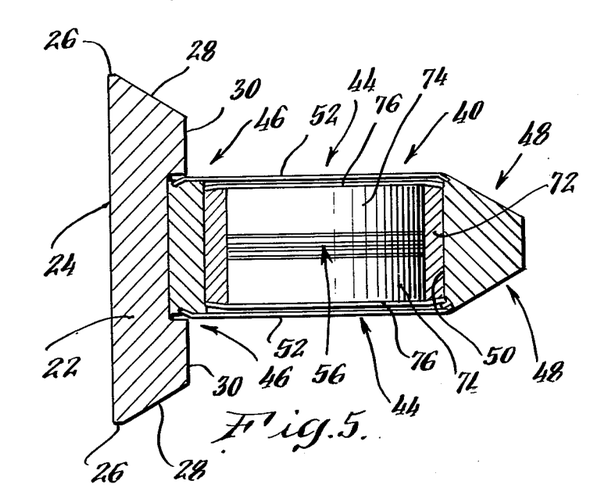
FIG. 5 is a horizontal section taken along line 5—5 of FIG. 2 to show details of the oil-filled capsule providing a sealed sensor element.

Referring also to FIG. 5, this bar presents to the vortices shed from the side edges 26 a unique pressure-transducer capsule arrangement, generally indicated at 44, which is peculiarly well adapted for sensing the vortex pressure fluctuations, as will be described hereinbelow in detail. The thickness T of the bar 40 (FIG. 3) is in the embodiment disclosed substantially less than the lateral dimension "w" between the outer edges of the rear surfaces 28, e.g. about one-half of that dimension. The arrangement of surfaces 28, 30 and 42 advantageously establishes recess-like pockets or cavity regions 46, on opposite sides of the bar, which accommodate the desired vigorous development and free, unimpeded passage of the shed vortices without significant degradation thereof as they pass down alongside of the sensor bar 40. These cavity regions moveover provide a suitably noise-free area for the pressure detector 44.

In the preferred embodiment, the sensor bar 40 is fabricated as an integral part of the flow meter member 14, being constructed therewith as part of the manufacturing operations. The vortex-generating plate 22, although formed separately, is secured to member 14, as by means of conventional machine screws or welding (not shown), so as to be an effectively integral part of member 14. However, it should be noted that this contiguous physical relationship is not essential to the performance of the flow meter, from an operational point of view. More specifically, the bar 40 may be spaced away from the rear surfaces of the plate 22, at least a short distance downstream, and the two components may be separately supported within the pipe section 10.

The downstream end of the sensor bar 40 (FIGS. 3 and 5) is formed with a tail piece 48 having side surfaces tapered at a moderate angle down to a flat, perpendicular rear surface. It has been found that the tapered configuration of this part of the bar is effective in providing good linearity between the changes in vortex-shedding frequency and the corresponding changes in fluid flow rate. Preferably, the angle of taper is about 30° with respect to the direction of fluid flow. The tail length TL and the tail width TW should be considerably smaller than the overall bar length L, desirably less than one-half and preferably less than one-quarter of that length.

Figure 6:
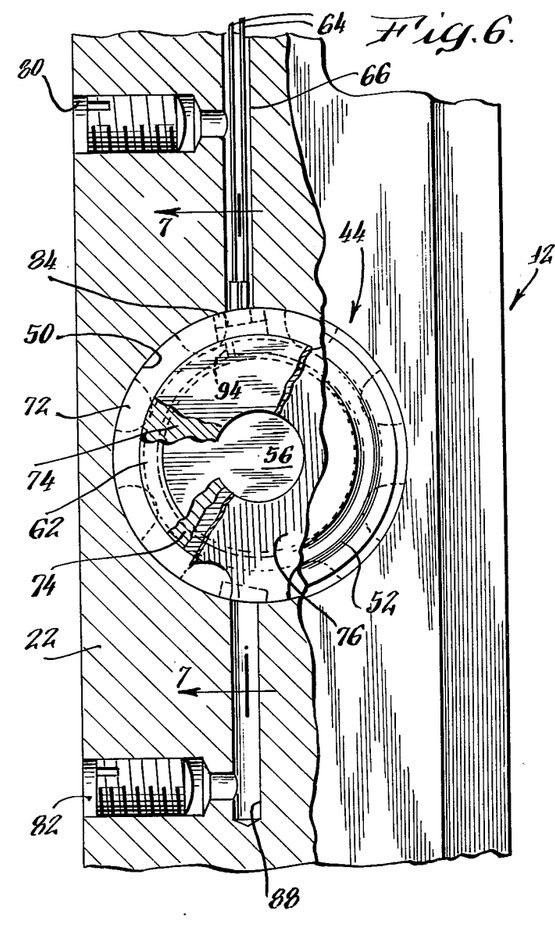
FIG. 6 is a vertical section through the central portion of the sensor bar, taken along a plane containing the pipe axis and showing the arrangement of the vortex-sensing capsule relative to the sensor bar.
Figure 7:
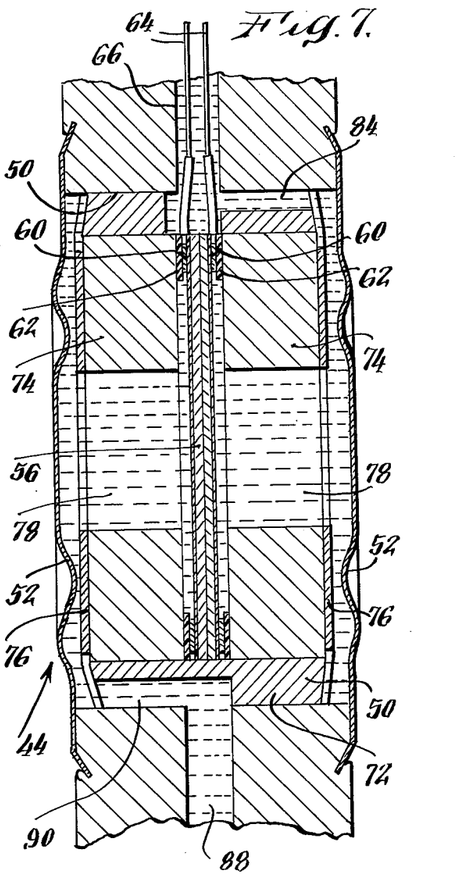
FIG. 7 is a detail section taken along line 7—7 of FIG. 6.

Referring now also to FIGS. 6 and 7, the special sealed transducer 44 is located in an interior chamber 50 of circular cross-section and extending completely through the bar 40. The transducer capsule comprises a pair of thin (0.003 inch), flexible, circular metal diaphragms 52, on opposite sides of the bar, adapted to seal an internal transducer element 56 (to be described below in detail) from the process fluid. These diaphragms transmit the vortex pressure energy into the interior of the chamber 50 to actuate the transducer element.

This flexible, area-type diaphragm arrangement provides a relatively large sensing area to be exposed to the vortex pressure fluctuations, ensuring that a suitably large proportion of the total vortex energy is made available to the transducer element, and tending to minimize the effects of noise by cancellation due to averaging over the entire area. Thus the diaphragm area should, from that point of view, be maximized. A circular diaphragm configuration is presently preferred for ease of manufacture, and also for ease of sealing the peripheral edges of the internal transducer element so as to maximize the pressure loading on that element. This sealing allows the transducer element to accept a greater proportion of the pressure signal, thus reducing fatigue effects in the diaphragms as well as increasing the available signal level.

There is no necessary limitation of the broad invention to circular diaphragms or transducer elements, and for some applications rectangular or other area configurations can be used with advantage, particularly for the purpose of maximizing the total area subjected to the vortex pressure fluctuations. The downstream dimension of the diaphragm (e.g. the diameter of a circular diaphragm) should be smaller than the spacing between successive vortices of either row, and preferably should be less than half of such spacing in order to avoid reduction of signal due to pressure pulses being applied simultaneously to both opposed diaphragms. However, within these constraints, the downstream dimension should be as large as possible and preferably at least one-tenth of the vortex spacing.

In the described embodiment designed for use in a pipe having a 3 inch internal diameter, the sensor bar 40 had an overall length L of 0.923 inch, with a chamber 50 having the maximum possible diameter (about 0.63 inch) which can be formed within the flat-sided regions of the bar 40 and accommodate diaphragms 52 having the maximum possible diameter of about 0.75 inch. In such a meter, the spacing between successive vortices in one row of the vortex street would be within the range of around 2.5 inches to 3.5 inches, so that the downstream dimension of the diaphragm was approximately one-quarter of the vortex spacing, or "wavelength" of the shed vortices.

The pressure fluctuations of the vortices shed from plate 22 are transmitted through the diaphragms 52 to a transducer element 56 which in this embodiment is a circular disc or wafer 56 of thin (0.021 inch) ceramic material having piezo-electric properties. The disc comprises two layers separated by a thin vane of electrically conductive material, e.g. brass (not shown); however, other types of piezo-electric elements can be used. The outer disc surfaces are covered with a thin film of silver (not shown) for making good electrical connection to the ceramic material so as to pick up the electrical signals developed by the disc in response to the applied pressure fluctuations.

Ceramic discs as described herein are available commercially, under the name Bimorph, from the Vernitron Corporation of Bedford, Ohio. The ceramic is edge-supported, preferably with a simple support comparable to a knife-edge or the equivalent, although a more conventional cantilever-type support is functional even though not as efficient. The applied pressure flexes the ceramic material (i.e. it operates in the so-called "flexure mode") which responds by generating corresponding positive and negative electrical charges at its opposite surfaces. A detailed discussion of the operational principles of such a device are set forth in an article by C. P. Germano in Volume AU-19, Number 1, of the March, 1971 issue of "IEEE Transactions on Audio and Electroacoustics", pages 6–12.

Figure 8:
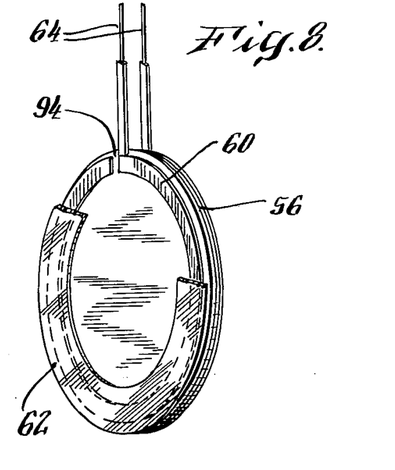
FIG. 8 is a detail perspective view showing the manner of making electrical connection to the ceramic disc.

Electrical contact with the silver coating on the sides of the ceramic disc 56 is effected by extremely thin copper rings 60 (see also FIG. 8) at both sides of the disc. These copper rings are bonded to and carried by thin layers of sheet plastic insulating material 62. At one circumferential point of each ring 60, the conductive material is extended out radially to corresponding copper leads 64 which pass up through a small vertical bore 66 (see FIG. 2) in the flow metering member 14. These leads are insulated by plastic sheathing bonded thereto, and are connected at their upper ends to respective terminals of an insulating glass-to-metal seal 68 of known construction. The leads 64 continue from the seal terminals to a weather-proofed enclosure 70 where they connect to a hermetically sealed amplifier 71A having a pair of output leads 65. These output leads deliver a d-c output signal to a terminal box section 71B of the enclosure 70. The amplifier 71A comprises circuitry for developing an output signal adapted to be transmitted over relatively long distances. Such circuitry does not form a part of the present invention, and thus will not be described herein in detail.

Surrounding the outer periphery of the ceramic disc 56 is a plastic insulating ring 72 made, for example, of a high-temperature plastic such as that known commercially as "Astrel". This plastic ring is forced outwardly into a tight liquid-sealing fit against the inner wall of the chamber 50 by the radial pressure of a pair of metal spacer rings 74 on opposite sides of the ceramic disc 56. The outer diameter of these spacer rings is slightly larger than the inner diameter of the insulating ring 72, and the spacer rings are pressed in place by sufficient force to expand the insulating ring slightly so as to establish the desired liquid-tight seal. The spacer rings are held in place by respective circular clamp plates 76 which are secured in conventional fashion such as by staking at the outer circumference points, or by a retainer ring arrangement (not shown). As shown in FIG. 6, these clamp plates are notched in spaced locations around their outer periphery, to permit the flow of liquid thereby.

The interior spaces of the chamber 50 are filled with oil 78 injected, for example, through oil ports 80 and 82 respectively above and below the chamber. The upper port 80 communicates with the vertical bore 66 (FIG. 2), and the oil inserted through that port fills the bore 66 and also flows down to the insulating ring 72. At the point where bore 66 enters the interior chamber 50, the insulating ring is formed, at its outer circumference, with a transverse passage 84 (see FIG. 7) providing for flow of the oil into the right-hand side of the chamber, passing through notches of the corresponding clamp plate 76 to the region between the right-hand diaphragm 52 and the ceramic disc 56. The oil from the lower port 82 flows up through a bore 88 to the insulating ring 72 where a transverse passage 90 in that ring carries the oil to the left, through the corresponding clamp plate 76, and into the spaces between the left-hand diaphragm 52 and the ceramic disc 56.

The oil fill 78 on both sides of the ceramic disc 52 serves to transmit to the disc the pressure fluctuations applied to the outer surfaces of the diaphragms 52 by the passage of the vortices shed by the plate 22. The ceramic disc is thereby flexed at the frequency of the passing vortices, and develops, in response, corresponding electrical pulses indicating, by the frequency of occurrence thereof, the flow rate of the fluid being monitored. The oil fill provides a desirably benevolent environment for the ceramic material, as well as for the other components of the transducer capsule. It also aids in filtering out noise pressure components appearing in the flowing fluid, reducing the need for electronic filtering of the transducer output signal.

Referring again to FIG. 8, the copper ring 60 on the near side of the disc 56 is interrupted at 94 to provide a small (0.005 inch wide) gap through which the oil fill 78 can flow, very slowly, whenever necessary to equalize the pressures on opposite side of the disc. Such pressure differential can build up as a result of ambient temperature variations, for example. The gap 94 is so small that essentially no oil can flow through it in response to the relatively rapid changes in pressure resulting from the vortices passing alongside the diaphragms.

With the above-described arrangement, the ceramic disc 56 is conductively insulated (electrically) from the metal body 12, from the flowing fluid, and from the pipe section 10. The signal produced by the transducer capsule is generated internally by piezo-electric action, so that no electrical energy need be directed into the interior of the body 12 or the flow system. The piezo-electric transducer not only develops a relatively large flow-responsive signal, but also is advantageous in that it does not introduce a permanent (long time) d-c component into the flow signal, even if the ceramic is physically offset in some manner. The transducer moreover is responsive only to differential pressure fluctuations, and not to static pressure variations or cooling effects from any source as when using thermal sensors. Thus the flow signal of the present transducer is relatively clean and more readily processable.

Vortex meters as described herein can be sized to suit different flow pipe diameters. The following Table I illustrates dimensional ranges which presently appear appropriate for pipe sizes of 2 inches, 3 inches and 4 inches, respectively. The dimensional reference symbols (W,L, etc.) shown in Table I correspond to those used with FIG. 3 of the drawings herewith.

Table I

| VORTEX SHEDDING BODY DIMENSIONS (ALL DIMENSIONS IN INCHES) | | | | | | |
|---|---|---|---|---|---|---|
| Pipe Size | W | D | L | T | TW | TL |
| 2" | 0.564 | 0.240 | .776 | 0.254 | 0.097 | 0.136 |
| 3" | 0.952 | 0.238 | .923 | 0.381 | 0.143 | 0.206 |
| 4" | 1.250 | 0.312 | .988 | 0.500 | 0.188 | 0.270 |

Figures 9, 10, 11, 12, 13:
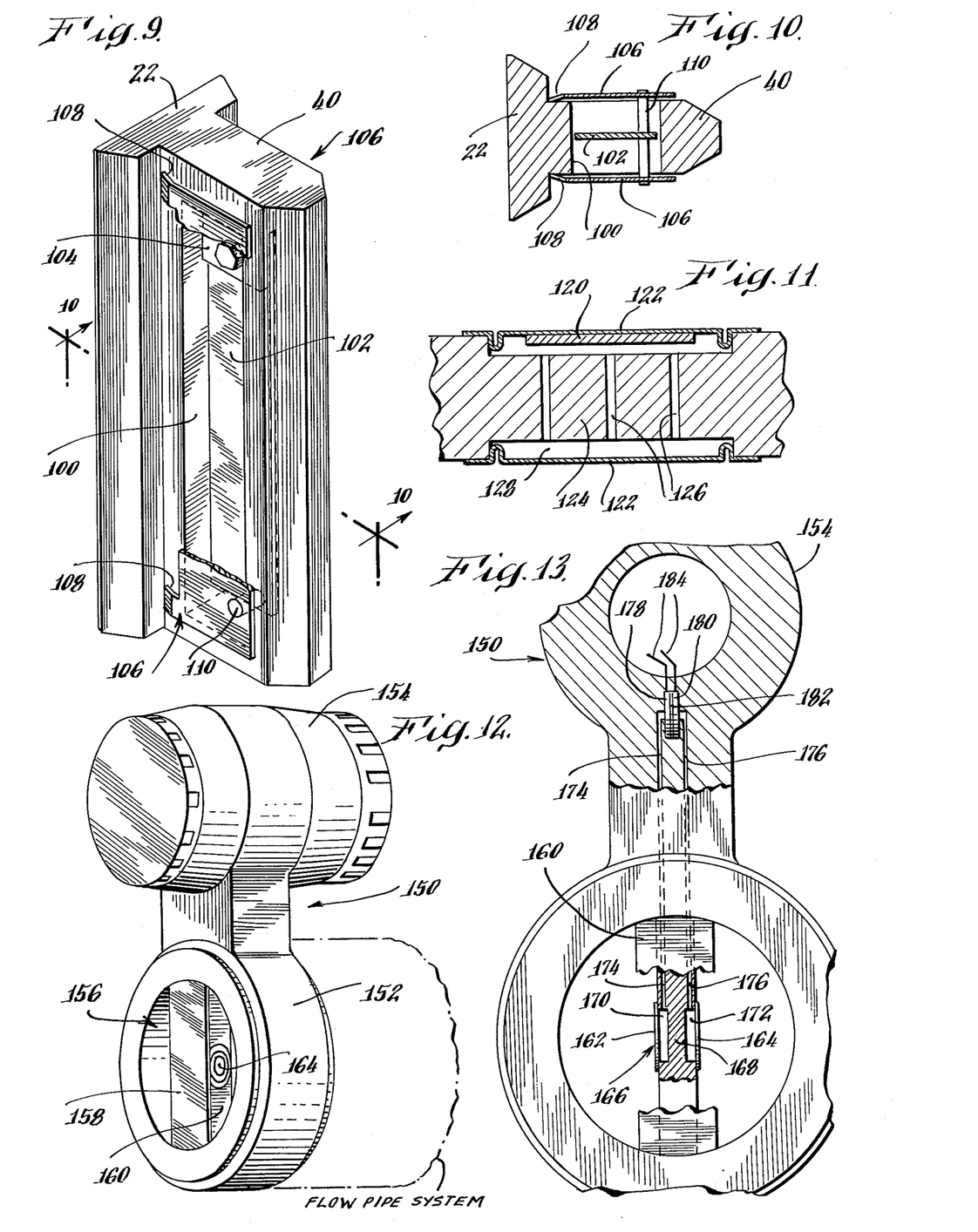
FIG. 9 is a perspective view showing a flapper-actuated piezo-electric sensor.
FIG. 10 is a horizontal section taken along line 10—10 of FIG. 9.
FIG. 11 shows an arrangement wherein a piezo-electric element is bonded to a flexible diaphragm of an oil-filled sensor unit.
FIGS. 12 and 13 show an arrangement wherein the detector element is located outside of the flow-pipe.

Referring now to FIG. 9, a flow metering arrangement is shown comprising a vortex-generating plate 22, as previously described, and a sensor bar 40 having an outline configuration as previously described, but with a different internal sensor arrangement. More particularly, the bar 40 is formed with a generally rectangular, elongate internal chamber 100, parallel to the longitudinal axis of the bar (i.e. extending diametrically with respect to the pipe section).

Within the rectangular chamber 100 is an elongate strip 102 of piezo-electric material such as previously described, extending substantially the full length of the chamber 100 and centrally positioned with respect thereto. At its upper end, this piezo-electric element is held rigidly by the pressure grip of a conventional clamp plate arrangement 104, to provide for cantilever-supported bending of the element 102 about an axis parallel to the direction of fluid flow.

At the side walls of the sensor bar 40 are respective elongate, rectangular flapper plates 106 of thin, somewhat flexible metal. These plates are formed at the upstream edges thereof with integral tabs 108 which bend inwardly to a region of pivotal engagement with the sensor bar 40. The plates 106 are fastened together mechanically by a pin 110 at the lower, downstream region of the plates. These plates serve in effect as flexures, bendable about the flexure points established by the tabs 108, in response to transverse forces due to pressure fluctuations from the vortices shed by vortex-generating plate 22.

The pin 110 which secures the flexure plate 106 together also is fastened to the lower end of the piezo-electric strip 102. Thus, as the flexure plates 106 move back and forth laterally (transversely between the two rows of shed vortices) due to alternating pressure fluctuations of the shed vortices, this movement is transmitted to the piezo-electric element 102 which develops a corresponding electrical output signal. This electrical output signal is conducted from the sensor element 102 by an electrical lead arrangement (not shown) as previously described, in order to present the piezo-electric signal to suitable processing means such as an electronic amplifier, etc.

It may be noted that the flapper plates 106 have a very substantial area subject to the vortex pressure fluctuations. That is, the downstream dimension of these plates is effectively equal to the side wall dimension (parallel to the fluid flow direction) of the sensor bar 40, and the longitudinal dimension is substantially equal to the axial dimension of the vortex-generating plate 22. Thus, a substantial portion of the available vortex energy is coupled to the the piezo-electric element 102.

The flexure plates 106 are spaced a short distance away from the side walls of the sensor bar 40, and the flowing fluid fills the interior of the chamber 100. Thus, this arrangement is suitable for cryogenic applications, where the fluid temperature would be so low as to preclude the use of an oil-fill as previously described with reference to the FIG. 7 arrangement.

FIG. 11 shows another arrangement having a sealed diaphragm capsule with an oil-fill. In this arrangement, a piezo-electric element 120, such as previously described, is insulatedly bonded directly to the internal surface of one of the sealing diaphragms 122. Thus the sensor element provides the primary spring-force reaction to the vortex pressure pulses, so that more of the vortex energy is directed to the sensor element, thereby producing a signal improvement. Also, the fatique effects in the metal diaphragm 122 are correspondingly reduced.

The inner section 124 of the capsule is formed with small holes 126 to permit flow of the oil-fill 128 from one side to the other, to provide for optimal damping of the dynamic response characteristics. Suitable means for making electrical connection to the sensor element can be provided as previously described. For some applications, it may be desirable to bond piezo-electric sensors to both of the diaphragms.

Referring now to FIGS. 12 and 13, there is shown a vortex-shedding flow-meter arrangement comprising a cast integral member 150 consisting of a flow section 152, adapted to be coupled into a flow-pipe system, and an outer weather-proofed enclosure 154 containing certain operating elements to be described. Within the flow channel defined by the flow section 152 there is mounted an elongate vortex-shedding body 156, welded or otherwise secured in place, which is formed, e.g. during extrusion, with a cross-sectional configuration as previously described with reference to FIG. 3 herein.

This elongate body 156 includes a front plate 158 and an integral trailing sensor-bar 160 having identical circular sealing diaphragms 162, 164 on opposite sides thereof. These diaphragms enclose an oil-filled interior chamber 166 of circular cross-section and having a divider partition 168 establishing two separate chamber sections 170, 172, each adjacent a corresponding diaphragm. As the shed vortices flow past the bar 160, the resulting pressure fluctuations are transmitted through the diaphragms 162, 164 into the corresponding oil-filled chamber sections.

These pressure fluctuations in the chamber sections 170, 172 are transmitted through respective oil-filled bores 174, 176 extending longitudinally through the sensor bar 160 to the outer enclosure 154. In that enclosure, these bores 174, 176 connect respectively to two oil-filled circular compartments 178, 180 located on opposite sides of a circular edge-supported piezo-electric detector element 182 such as the ceramic disc previously described hereinabove. The vortex pressure pulses transmitted into these compartments create alternating bending stresses in this piezo-electric element, causing it to generate corresponding voltage signals between its outer side surfaces. These voltage signals are directed through suitable leads 184 (such as previously described but for simplicity not shown in detail in FIGS. 12 and 13) to signal processing apparatus in the weather-proofed enclosure 154, including electronic amplifiers and the like, arranged to develop a relatively high-powered flow signal for transmission to a remote control room, etc.

The arrangement of FIGS. 12 and 13 has several significant advantages. First, the piezo-electric element 178 is located remotely from the process fluid flowing past the pressure-sensing diaphragms 162, 164, and is thereby effectively isolated from that fluid, particularly with respect to temperature effects. For example, a typical piezo-electric element limited to operation at temperatures no greater than 300° F can, in the FIG. 12 arrangement, perform satisfactorily even though the process fluid temperatures are much higher than 300° F, e.g. perhaps as high as 600° F or so, i.e. at or near the maximum temperature to which the oil-fill liquid can be subjected without adverse effects.

Also, by physically separating the diaphragm chamber sections 170, 172 from the detector compartments 178, 180, it is possible to selectively control the ratio between the area of the diaphragms 162, 164 and the area of the piezo-electric element 178. In that regard, it has been found that a desirably high efficiency in piezo-electric signal generation can be achieved by dimensioning the various parts so that the diameter of the piezo-electric element 178 is 1.6 times the diameter of the diaphragms 162, 164, thus providing an area ratio of about 2.5:1.

The FIG. 12 arrangement also is advantageous in that the entire vortex-shedding flow-meter apparatus can be supplied as an integral structure, suitable for installation into a flow system without difficulty, and operable as a composite unit to produce an appropriate flow signal for transmission to a remote region. Advantageously, the axial dimension of such unit is relatively short. For example, the length of section 152 may be only 10% or 20% longer than the downstream length of the body 156, providing of course that such dimensions are compatible with other perfromance characteristics required of the overall system.

Although preferred embodiments of the invention have been described hereinabove in detail, it is desired to emphasize that this is for the purpose of illustrating the invention and thereby to enable those skilled in this art to adapt the invention to various different applications requiring modifications to the apparatus described hereinabove; thus, the specific details of the disclosures herein are not intended to be necessary limitations on the scope of the present invention other than as required by the prior art pertinent to this invention.

We claim:

1. Flow-metering apparatus of the vortex-shedding type comprising:
   a flow-pipe section adapted to be coupled into a flow system;
   a vortex-generating body mounted in said flow pipe section;
   means defining an enclosed chamber downstream of said body including flexible diaphragm means as one wall of said chamber arranged to respond to the pressure fluctuations of vortices shed from said body and to transmit such pressure fluctuations into the interior of said chamber;
   sensor means located outside of said flow-pipe section, remote from the process fluid flowing through the associated flow system;
   said sensor means comprising an enclosed compartment;
   a pressure-responsive piezo-electric sensor element in said compartment;
   the area of said sensor element being about 2.5 times the area of said diaphragm means;
   conduit means connecting said compartment with said enclosed chamber; and
   liquid filling in said conduit means, said chamber, and said compartment, to transmit vortex pressure pulses from said flexible diaphragm means to said piezo-electric sensor element to produce a pulsating flow signal corresponding to the fluid flow rate.

2. Flow-metering apparatus of the vortex-shedding type comprising:
   a flow-pipe section adapted to be coupled into a flow system;
   a vortex-generating body mounted in said flow pipe section;
   means defining an enclosed chamber downstream of said body including flexible diaphragm means as one wall of said chamber arranged to respond to the pressure fluctuations of vortices shed from said body and to transmit such pressure fluctuations into the interior of said chamber;
   sensor means located outside of said flow-pipe section, remote from the process fluid flowing through the associated flow system;
   said sensor means comprising an enclosed compartment;
   a pressure-responsive piezo-electric sensor element in said compartment;
   said sensor element and said diaphragm means both being circular in configuration;
   the diameter of said sensor element being about 1.6 times the diameter of said diaphragm means;
   conduit means connecting said compartment with said enclosed chamber; and
   liquid filling in said conduit means, said chamber, and said compartment, to transmit vortex pressure pulses from said flexible diaphragm means to said piezo-electric sensor element to produce a pulsating flow signal corresponding to the fluid flow rate.

3. Flow-metering apparatus comprising:
   a vortex-shedding element to be positioned in a flowing fluid and having laterally-spaced surfaces adapted to shed spaced rows of vortices at a frequency corresponding to the fluid flow rate;
   vortex-sensing means positioned downstream of said element between said rows of vortices to produce a signal responsive to said shedding frequency;
   said vortex-sensing means comprising a structure having a predetermined downstream dimension and defining an internal cavity with side regions thereof facing said rows of vortices, respectively;
   first and second thin flexible diaphragms sealingly secured to said structure adjacent and at least approximately parallel to said side regions of said cavity, said diaphragms serving to fully enclose and seal said cavity;
   a liquid fill in said cavity supporting said diaphragms against static pressure of said flowing fluid and providing for transmission within said cavity of pressure fluctuations applied to said diaphragms by said vortices;
   a substantially rigid, pressure-responsive member mounted within and across said cavity in a position at least approximately parallel to said diaphragms to be subjected to said pressure fluctuations, said member having an electrical characteristic which varies with changes in the differential pressure appearing across the surfaces of said member which face said diaphragms;

means mounting said member within said cavity and arranged to provide for effective liquid sealing between the two regions of said cavity on opposite sides of said member, whereby the movement of said diaphragms in response to said pressure fluctuations is effectively minimized so as to avoid fatiguing said diaphragms during extended periods of usage of the apparatus; and electrical transmission means connected to said member within said cavity and leading out through said structure to provide for access to the remote end of said transmission means from outside of the flowing fluid for connection to means to develop a flow signal responsive to the frequency of said changes of said electrical characteristic.

4. Flow-metering apparatus comprising:

a vortex-shedding element to be positioned in a flowing fluid stream to produce vortices at a frequency corresponding to the fluid flow rate;

vortex-sensing apparatus for detecting the vortices in the fluid comprising:

a structure providing sealed interior spaces;

first and second diaphragms forming part of said structure to contact the flowing fluid and to transmit into said sealed interior spaces pressure variations resulting from said vortices;

a liquid fill in said sealed spaces supporting said diaphragms against static pressure of said flowing fluid and providing for transmission within said sealed spaces of said pressure variations applied through said diaphragms;

a substantially rigid pressure-responsive member mounted within said interior spaces and having opposed sides subjected respectively to said pressure variations developed by said first and second diaphragms, said member having an electrical characteristic which varies with changes in the differential pressure appearing between said opposed sides due to said pressure variations;

means mounting said member to provide for effective liquid sealing between the two regions which are respectively adjacent said opposed sides of said member, thereby to prevent shunting flow of liquid around said member; and electrical transmission means connected to said member to develop a signal responsive to the frequency of said changes of said electrical characteristic.

5. Flow-metering apparatus comprising:

a vortex-shedding element to be positioned in a flowing fluid stream to produce vortices at a rate corresponding to the fluid flow rate;

vortex-sensing apparatus for detecting the vortices in the fluid comprising:

wall means defining sealed internal spaces;

first and second diaphragms forming part of said wall means to be exposed to said flowing fluid and to transmit into said sealed spaces pressure fluctuations caused by said vortices;

a liquid fill in said sealed spaces to support said diaphragms against static pressure of said flowing fluid and to provide for transmission within said sealed spaces of said pressure fluctuations applied through said diaphragms;

a substantially-rigid piezo-electric member within said sealed spaces and having opposed surfaces positioned to be subjected to the differential pressure developed between said diaphragms by said pressure fluctuations so as to produce an alternating voltage signal reflecting the vortex-shedding frequency;

means fixedly mounting said piezo-electric member to provide for effective liquid sealing between the regions adjacent said opposed surfaces thereof to prevent movement of liquid past said piezo-electric member, whereby said piezo-electric member provides pressure-responsive sensitivity without requiring significant movement of said liquid and said diaphragms; and means to develop a flow signal responsive to the frequency of said alternating voltage signal.

6. Apparatus as in claim 5, wherein said piezo-electric member comprises an edge-supported disc.

7. Flow-metering apparatus of the vortex-shedding type comprising:

a flow-pipe section adapted to be coupled into a flow system;

a vortex-generating body mounted in said flow-pipe section;

means near said vortex-generating body providing an enclosed chamber and including means dividing said chamber into two separate sections;

first and second diaphragm means forming part of said chamber sections respectively and arranged to respond to the pressure fluctuations of vortices shed from said body and to transmit such pressure fluctuations into the interior of each chamber section;

sensor means located outside of said flow-pipe section;

said sensor means comprising first and second enclosed compartments;

conduit means connecting said first and second compartments with said first and second chamber sections respectively;

liquid filling in said conduit means, said chamber sections and said compartments, to transmit vortex pressure pulses from said diaphragm means to the interior of each compartment;

said sensor means further comprising pressure-responsive means sealingly mounted adjacent said compartments to receive at opposite sides thereof the pressure pulses from said compartments respectively;

said pressure-responsive means including means providing an electrical characteristic which varies with changes in the differential pressure appearing between said opposite sides due to said pressure-pulses; and electrical transmission means connected to said pressure-responsive means to develop a signal corresponding to the frequency of variation of said electrical characteristics.

8. Apparatus as in claim 7, wherein said pressure-responsive means comprises a piezo-electric member.

9. Apparatus as in claim 8, wherein said piezo-electric member is an edge-supported disc.

10. Apparatus as in claim 8, wherein the area of said piezo-electric member is about 2.5 times the area of either of said diaphragm means.

11. Apparatus as in claim 8, wherein said piezo-electric member is circular in configuration, and both of said first and second diaphragms means are circular in configuration with diameters of equal size;

the diameter of said piezo-electric member being about 1.6 times the diameter of said first and second diaphragm means.

* * * * *